United States Patent [19]

Petersen

[11] Patent Number: 4,871,992

[45] Date of Patent: Oct. 3, 1989

[54] TACTILE DISPLAY APPARATUS

[76] Inventor: Robert C. Petersen, 37 Prospect Hill Rd., Noank, Conn. 06340

[21] Appl. No.: 216,880

[22] Filed: Jul. 8, 1988

[51] Int. Cl.$^4$ .......................... G08B 1/00; G09B 21/00
[52] U.S. Cl. ............................. 340/407; 340/825.19; 434/112; 434/113; 434/114
[58] Field of Search .............. 340/407,711,712,825.19; 434/112-115

[56] References Cited

U.S. PATENT DOCUMENTS

| | | |
|---|---|---|
| 2,891,324 | 6/1959 | Zuk . |
| 3,395,247 | 7/1968 | Fieldgate . |
| 3,510,967 | 5/1970 | King et al. . |
| 3,592,965 | 7/1971 | Diaz . |
| 3,594,787 | 7/1971 | Ickes . |
| 3,618,070 | 11/1971 | Kagan . |
| 3,987,438 | 10/1976 | Lindenmüeller . |
| 4,033,053 | 7/1977 | Engler . |
| 4,044,350 | 8/1977 | Tretiakoff et al. . |
| 4,178,586 | 12/1979 | Schönherr . |
| 4,191,945 | 3/1980 | Mannen et al. . |
| 4,194,190 | 3/1980 | Bareau . |
| 4,215,490 | 8/1980 | Fewell . |
| 4,266,936 | 5/1981 | Rose et al. . |
| 4,445,871 | 5/1984 | Becker . |
| 4,473,356 | 9/1984 | Fernando et al. . |
| 4,488,146 | 12/1984 | Burchart . |
| 4,586,903 | 5/1986 | Burchart . |
| 4,586,904 | 5/1986 | Chlumsky . |

Primary Examiner—Donnie L. Crosland
Attorney, Agent, or Firm—Albert W. Hilburger

[57] ABSTRACT

Apparatus for providing a tactile display according to which a touch pin is selectively movable relative to a reference surface. An electromagnet distant from the reference surface has spaced poles of opposite, selectively reversible, polarity. A cam rotatable about an axis transverse to the reference surface has an integral permanent magnet with similarly spaced poles of opposite polarity equidistant from the axis of rotation. The cam is rotatable between an active position at which its respective poles are attacted to and positioned adjacent the poles of the electromagnet and an inactive position at which the reversed poles of the permanent magnet are attracted to and positioned adjacent the opposite poles of the electromagnet. A touch pin has a longitudinal axis transverse to the reference surface and includes a follower end engageable with the cam and a tip end distant from the follower end. The pin is movable on the cam between a first position raised above the reference surface when the cam is in the active position and a second position not projecting beyond the reference surface when the cam is in the inactive position. A plurality of touch pins and associated mechanisms can be combined into a matrix to form a tactile display unit and a plurality of such units can be provided in a console and electrically driven in an intelligent fashion to provide the user with various forms of tactile information.

20 Claims, 4 Drawing Sheets

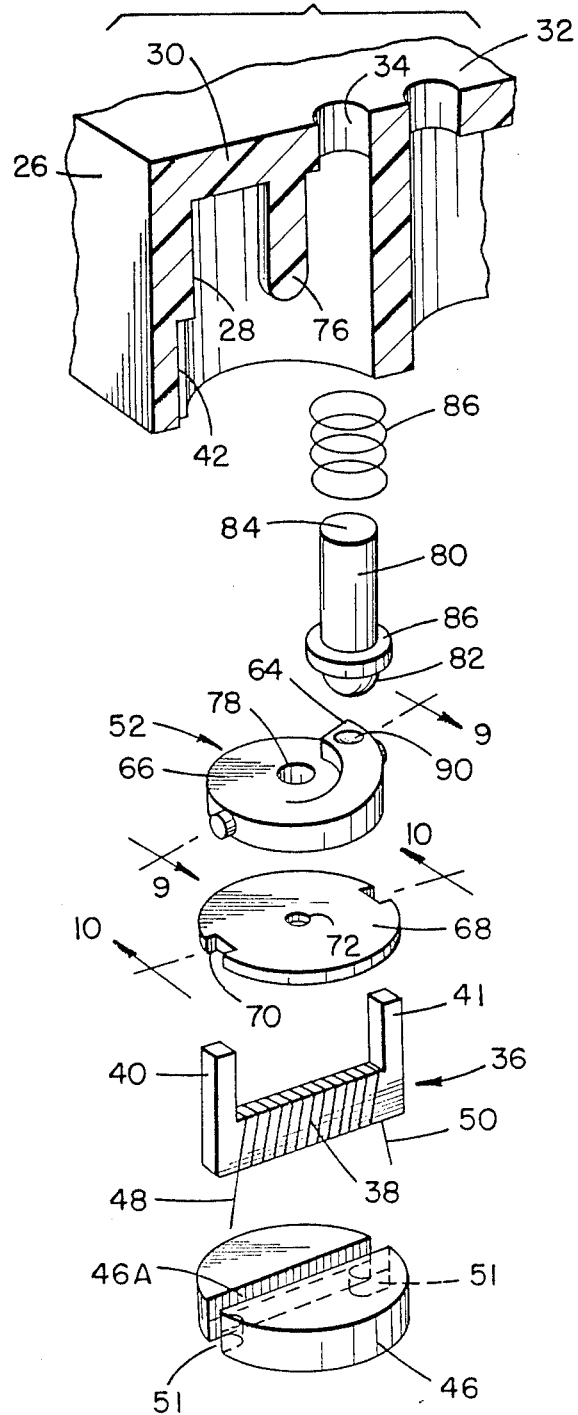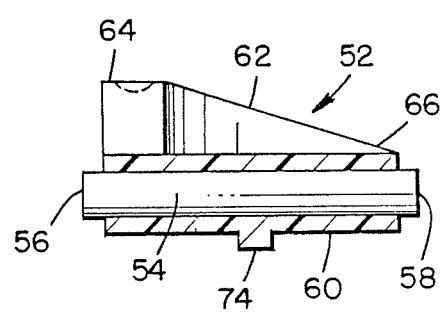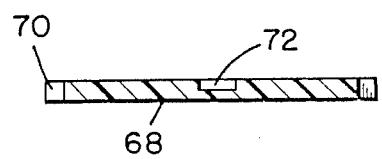

TACTILE DISPLAY APPARATUS

BACKGROUND OF THE INVENTION

I. Field of the Invention

The present invention relates generally to tactile display apparatus, and, more particularly, to an electromechanical system for selectively displaying and erasing information from a reference surface.

II. Description of the Prior Art

A particularly desirable application for the invention concerns the presentation of the Braille character set for the blind. However, there are numerous other applications for the invention.

For example, a large matrix of tactile display units could be employed to display numbers, letters, and figures as raised patterns in devices that provide viewing screens for the blind. The sighted can also benefit from the invention. For example, tactile display units can be utilized singularly or in groups as displays on operating consoles for limited or low light conditions such as aircraft, mining equipment, and military hardware where the raised patterns can be utilized as nonvisual indicators.

Braille was devised to enable the blind to read alphanumeric characters and is in the form of a six unit code, where each cell represents a character or symbol. Thus, with a six unit code in each cell, there is a matrix of two columns with three in a column. By employing a six unit code, a maximum of sixty-four combinations can be created for which include the twenty-six letters of the alphabet, the numbers zero and one through nine, and various symbols such as case indicators, punctuation, and so forth.

A tactile display unit of the type which will be described in detail below is one which provides for the raising and lowering of a physical point above a plane of reference in such a manner that the change of state from one position to another, that is, from a raised position to a lowered position, or vice versa, is physically detectable by the sense of touch. Numerous mechanisms have been devised to provide such tactile displays. They have generally been large, complex, cumbersome, and expensive to construct, operate, and maintain. Many have been patented. Typical of patents which disclose such devices utilizing magnetically operable pins or solenoids are Nos. 3,395,247; 3,510,967; 3,592,965; 3,987,438; 4,033,053; 4,178,586; 4,191,945; and 4,194,190. Other typical patents disclose a variety of other mechanisms for achieving a similar result. For example, No. 2,891,324 discloses a mechanism which utilizes piano-like rolls; Nos. 4,044,350 and 4,473,356 disclose piezoelectric reeds; No. 4,586,904 discloses magnetically operable balls; No. 4,215,490 discloses mechanical linkages; No. 4,266,936 discloses bi-metallic latches; and Nos. 4,445,871 and 4,586,903 disclose the use of continuous belts. Because of their complexity, most of these known devices are expensive to manufacture, thereby resulting in an end product with a cost that is prohibitive to many consumers. Also, the power requirements of some of these devices require drive levels that are beyond the capability of most target units without the addition of a supplemental power supply.

SUMMARY OF THE INVENTION

It was with knowledge of the prior art as just described and with the goal of improving upon known technology that the present invention was conceived and has now been reduced to practice. To this end, novel apparatus is disclosed for providing a tactile display according to which a touch pin is selectively movable relative to a reference surface. An electromagnet distant from the reference surface has spaced poles of opposite, selectively reversible, polarity. A cam rotatable about an axis transverse to the reference surface has an integral permanent magnet with similarly spaced poles of opposite polarity equidistant from the axis of rotation. The cam is rotatable between an active position at which its respective poles are attracted to and positioned adjacent the poles of the electromagnet and an inactive position at which the reversed poles of the permanent magnet are attracted to and positioned adjacent the opposite poles of the electromagnet. A touch pin has a longitudinal axis transverse to the reference surface and includes a follower end engageable with the cam and a tip end distant from the follower end. The pin is movable on the cam between a first position raised above the reference surface when the cam is in the active position and a second position not projecting beyond the reference surface when the cam is in the inactive position. A plurality of touch pins and associated mechanisms can be combined into a matrix to form a tactile display unit and a plurality of such units can be provided in a console and electrically driven in an intelligent fashion to provide the user with various forms of tactile information.

Depending on the desired application, the apparatus of the invention could be fabricated in a variety of sizes. In the instance of a Braille character display, for example, a size would be chosen that would allow a two-by-three matrix of tactile display devices to be packaged to provide a Braille character readout at the same scale as an embossed Braille text.

The apparatus described in this disclosure is operated by utilizing an induced electromagnetic force to rotate the cam about its longitudinal axis. The cam has a touch pin riding on a contoured surface. By rotating, the cam forces motion of the pin along its longitudinal axis which raises or lowers the pin. The contoured surface of the cam is so shaped that at its lowest position, the pin that rides on it is flush with the reference surface. At its highest point of travel, the pin is raised sufficiently to provide the user with a tactile point that is readily discernible from the lowered state.

The up and down motion of the touch pin is achieved by driving the cam with small positive and negative voltages, respectively. Simple decoding circuitry would assign positive voltages to a bit that is in the high (logical 1) state and a negative voltage to a bit that is in the low (logical 0) state. In the Braille example, a six bit data bus would be established to drive all six touch pins of a tactile display unit simultaneously.

These high and low signals would alternately supply positive and negative voltages to the electromagnet that is located below the cam. Embodied in the cam is a permanent magnet which would be repelled by the electromagnetic force. By the construction of the device, this action would force the cam to rotate about its axis to position the pin at the desired point. The high point of the contour on the cam would desirably have a small depression in which the pin can temporarily come to rest. Due to its design, the lower portion of the cam does not require an additional depression. Under the bias of a spring on the pin, the cam as well as the pin remain mutually in their desired positions until an opposite voltage is applied. This arrangement provides the latching mechanism for the device. The electrical current resulting from the drive voltages and the pulse duration is sufficient to force the cam out of its 'latched' position to the desired state without a constant voltage being applied to maintain the desired state.

By the inclusion of 'stops' in the body of the unit and the rotating cam, the two magnets are never perfectly aligned. This prevents the cam from being 'frozen' in an aligned position. The alignment of these 'stops' also limits the motion to less than 180 degrees. The arrangement of the two magnetic poles ensures that the cam is 'repelled' from one state to the other, it being considered that magnetic repulsion is more effective to operate the cam and its associated touch pin than is magnetic 'attraction'.

In a Braille application, each tactile display unit is preferably configured into a two-by-three matrix of these tactile display devices. By arranging these units into a matrix not unlike core memory or a computer keyboard, a series of these units can be addressed with a minimum of internal decoding and driver circuitry.

An ASCII character is translated into a six bit Braille representation and transmitted along the rows and columns of the matrix to the proper unit.

The application of the invention is presented in this disclosure primarily as a device for representing Braille characters. However, any touchable type of display that utilizes a matrix of pins to represent numbers, letters, or figures could gain a benefit from this device. Other possible applications include computer CRT repeaters, adding machine displays, electronic clocks, digital thermometers, elevator floor indicators and any other device that utilizes digital display technology. The ultimate goal of the invention is to provide a design that will result in the fabrication of a low-cost, low power device that employs a simple mechanism to display tactile data that ensures a long life span for each component.

Primary features of the invention, then, include its compact, durable, and simplified design utilizing a minimum of moving parts and commonly available materials. It is inexpensive to manufacture and maintain and is capable of achieving a long life span. Additionally, its modular design enables an end use to employ as many or as few tactile display devices or units as necessary.

Other and further features, objects, advantages, and benefits of the invention will become apparent from the following description taken in conjunction with the following drawings. It is to be understood that both the foregoing general description and the following detailed description are exemplary and explanatory but not restrictive of the invention. The accompanying drawings, which are incorporated in and constitute a part of this invention, illustrate one embodiment of the invention and, together with the description, serve to explain the principles of the invention in general terms. Throughout the disclosure, like numerals refer to like parts.

BRIEF DESCRIPTION OF THE DRAWINGS

FIG. 8 is an exploded perspective view, partially cut away and shown in section, illustrating one tactile display device of which there are several in a tactile display unit;

FIG. 9 is a cross section view taken generally along line 9—9 in FIG. 8;

FIG. 10 is a cross section view taken generally along line 10—10 in FIG. 8; and

DESCRIPTION OF THE PREFERRED EMBODIMENT

Figure 1:
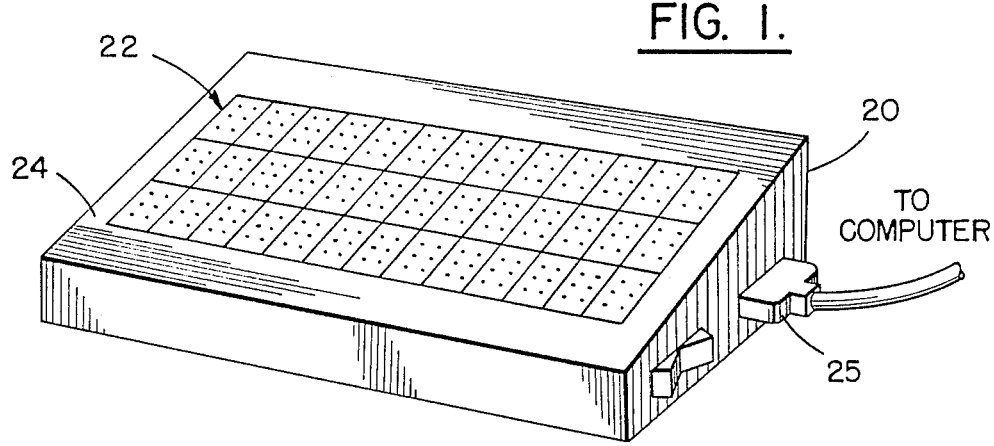
FIG. 1 is a prospective view of a Braille reader utilizing a plurality of tactile display units embodying the present invention.

Turn now to the drawings and initially to FIG. 1 which illustrates a console 20 which may, for example, be a Braille reader embodying the invention. A plurality of tactile display units 22 are embedded in an inclined upper surface 24 of the console 20, so positioned that a blind person could readily read the information being presented at the same spacing as embossed Braille text. Each tactile display unit 22 is sized and shaped similar to a twelve pin DIP (dual in-line package) (see FIGS. 2 and 3) and is both mechanically mounted on the console 20 and connected electrically to its internal electronic circuitry in a manner not unlike a conventional integrated circuit (IC). Data for display purposes on the console 20 are received from a host computer system (not shown) through an external interface 25.

Turn now to FIGS. 4–7, for a detailed description of the tactile display unit 22. Each unit 22 which is configured for a Braille display includes a housing 26 formed with a plurality of cavities 28, preferably cylindrical, generally arranged in two columns with three cavities per column. The central two cavities are slightly offset from the remaining or end cavities for a reason which will be explained subsequently. Central axes of the cavities 28 are substantially parallel and are substantially equally spaced.

Figure 5:
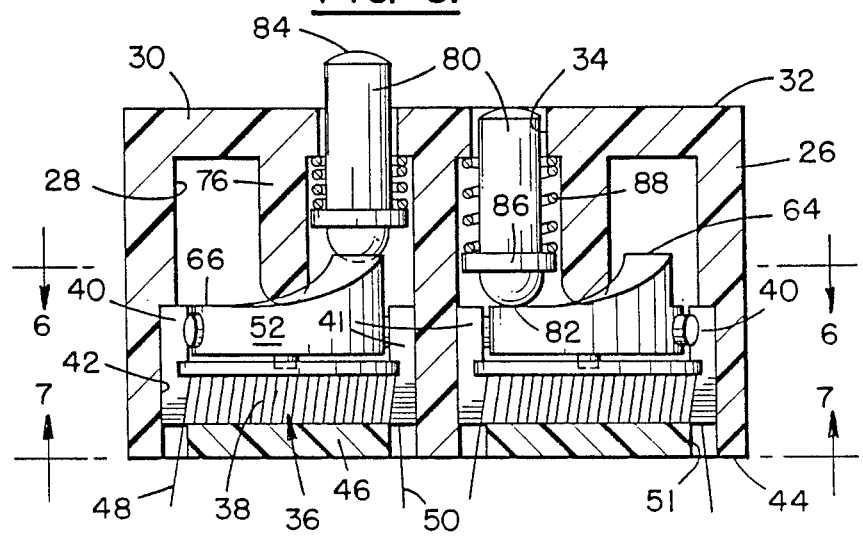
FIG. 5 is a cross section view taken generally along 5—5 in FIG. 4.
Figure 6:
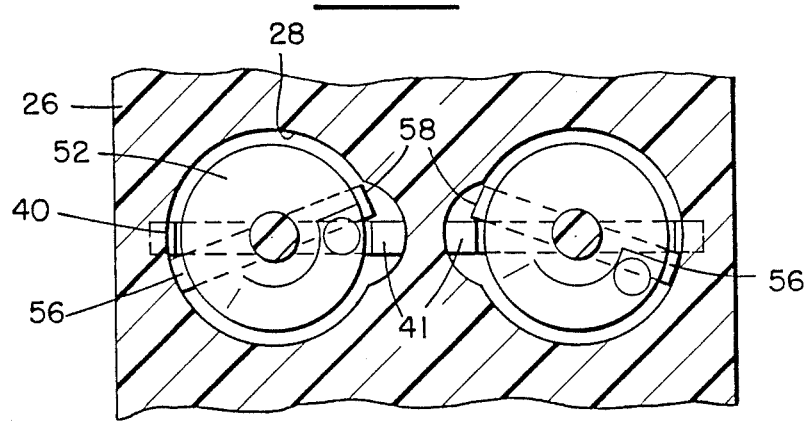
FIGS. 6 and 7 are cross section views taken, respectively, along lines 6—6 and 7—7 in FIG. 5.
Figure 7:
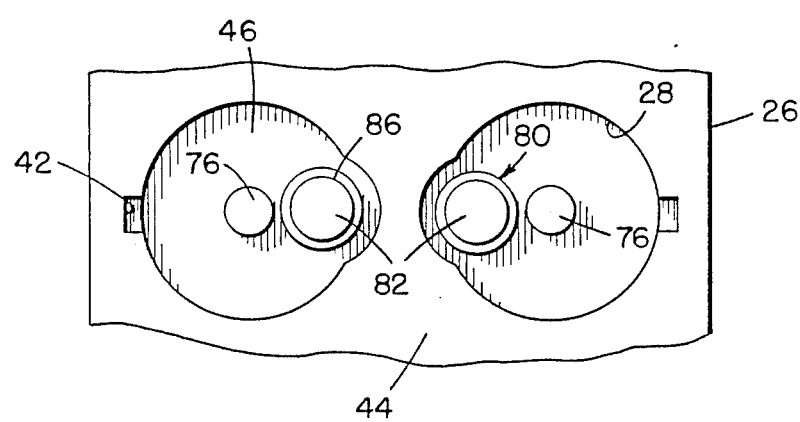

As seen in FIG. 5, a roof 30 is integral with the housing 26, so positioned as to overlie all of the cavities 28. The roof 30 defines a reference surface 32 which is preferably planar and has a plurality of apertures 34 suitably formed to enable communication between each cavity 28 and the reference surface 32.

A generally U-shaped electromagnet 36 is fixed to the housing 26, as best seen in FIG. 8. It includes a central bight portion 38, and a pair of upstanding legs 40 and 41. The wall of the cavity 28 is formed with an elongated slot 42 which is generally parallel to the central axis of the cavity 28. The leg 40 of the electromagnet 36 is fittingly received in the slot 42. The slot is sufficiently deep that, when fully inserted, the bight 38 of the electromagnet 36 is spaced from an undersurface 44 of the housing 26. This space permits fitting reception of a plug 46 which serves to seal the bottom of the cavity 28. The outer surface of the plug 46 is substantially flush with the undersurface 44. Electrical leads 48 and 50 (FIG. 5) extend from opposite ends of the bight 38 through diametrically opposed openings 51 in the plug 46 and thereby define the legs 40, 41 as being spaced poles of opposite, selectively reversible, polarity. The inner surface of the plug 46 is slotted, as at 47A, to accept the bight 38 of the electromagnet 36 and, together with the slot 42, prevent any possible rotation of the electromagnet 36 within the cavity 28.

A generally disk-shaped cam 52 is positioned proximate to the electromagnet 36, lying generally in a plane parallel to the bight 38 and extending between the legs 40 and 41. The cam 52 is rotatable about an axis which is the same as that of the cavity 28 and perpendicular to the reference surface 32. A permanent magnet 54 is suitably embedded in the cam 52 (see FIG. 9) and extends between spaced poles 56 and 58 of opposite polarity which are equidistant from the axis of rotation of the cam 52. The cam 52 has a planar base surface 60 which is substantially parallel to the reference surface 32 and it has a contoured operative surface 62 on a side opposed to the base surface 60 which ranges between an elevated region 64 of maximum height above the base surface 60 and a nominal region 66 of minimum height above the base surface.

A planar or wafer-like bearing member 68 (see FIGS. 8 and 10) is desirably mounted on the bight of the electromagnet 36. The bearing member 68 is preferably circular in shape with diametrically opposed notches 70 formed therein for engagement with the legs 40 and 41 to prevent relative movement between the bearing member and the electromagnet. A centrally positioned dimple 72 serves to freely receive a centrally disposed projection 74 which extends from the base surface 60 of the cam. The bearing member 68 is of a suitable material which enables substantially friction free rotation of the cam 52 thereon and, by reason of the interaction between the projection 74 and dimple 72, serves to maintain the central positioning of the cam within the cavity 28.

Also serving to maintain the position of the cam 52 within the cavity 28 is a positioning finger 76 which is integral with the housing 26 and extends downwardly from the roof 30 so as to be freely engageable with a centrally disposed depression 78 formed in the operative surface 62 of the cam. The term "freely engageable" is taken to mean that while the extreme tip of the positioning finger 76 is received within the depression 78, it does not in fact bear against the cam during normal operation, but only if the cam tends to move off its axis as it rotates. In essence, then, the extreme tip of the finger 76, the depression 78, the projection 74, and the dimple 72 all cooperate to serve as an axle to maintain the proper positioning of the cam on its axis of rotation and to transmit all of the magnetic force to that of rotation.

Also received within the cavity 28 is a touch pin 80 having a longitudinal axis which is substantially perpendicular to the reference surface 32. The touch pin includes a follower end 82 which is engageable with the cam 52 and a tip end 84 distant from the follower end. The pin is movable on the cam 52 between a first position as seen at the left side of FIG. 5 at which the tip end 84 is raised above the reference surface 32 and a second position as seen at the right side of FIG. 5 in which the tip end 84 does not project beyond the reference surface when the cam is in an inactive position. That is, the cam 52 is in the active position with the follower end 82 is engaged with the elevated region 64 and is in the inactive position when the follower end is engaged with the nominal region 66. Intermediate the ends 82 and 84, the touch pin 80 has an annular shoulder 86 which lies in a plane substantially perpendicular to the longitudinal axis thereof. A compression spring 88 encircles the pin and extends between the annular shoulder and the roof 30 and thereby biases the end 82 into engagement with the operative surface 62 of the cam.

Thus, when the electromagnet 36 is energized with a certain polarity such that the pole 56 of the permanent magnet 54 is caused to move to a position adjacent the leg 40, the pole 58 is simultaneously positioned nearest the leg 41 and the cam 52 assumes its active position with the follower end 82 engaged with the elevated region 64 and tip end 84 projecting from the reference surface 32 (left side of FIG. 5). The elevated region may be provided with a slight recess 90 (see FIG. 8) to hold the follower end 82 in position thereon when the cam assumes the active position. Alternatively, when the polarity of the electromagnet is reversed such that the pole 58 of the permanent magnet is attracted to the leg 41 and pole 56 is positioned adjacent the leg 40, the follower end 82 is in engagement with the nominal region 66 such that the cam 52 now assumes the inactive position with tip end 84 no higher than the reference surface 32 (right side of FIG. 5). It should be noted that the length of the permanent magnet 54 is slightly greater than the distance between the legs 40 and 41 such that the magnet 54 can never become aligned with the bight 38. Thus the legs 40 and 41 serve as stops for the magnet 54 and thereby prevent it from becoming aligned with the unlike poles of the electromagnet 36 which might prevent the cam 52 from rotating in the desired direction.

Figure 2:
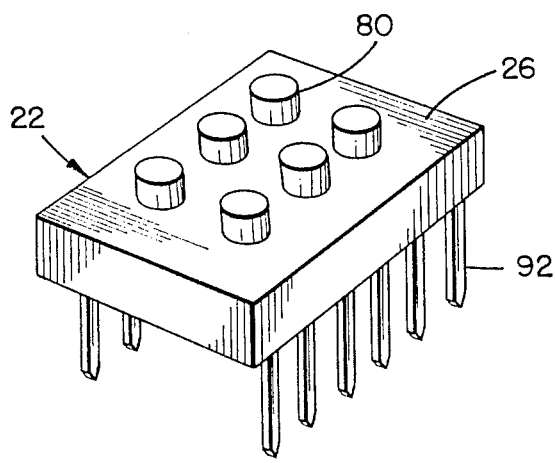
FIG. 2 is a prospective view of a tactile display unit embodying the invention.
Figure 4:
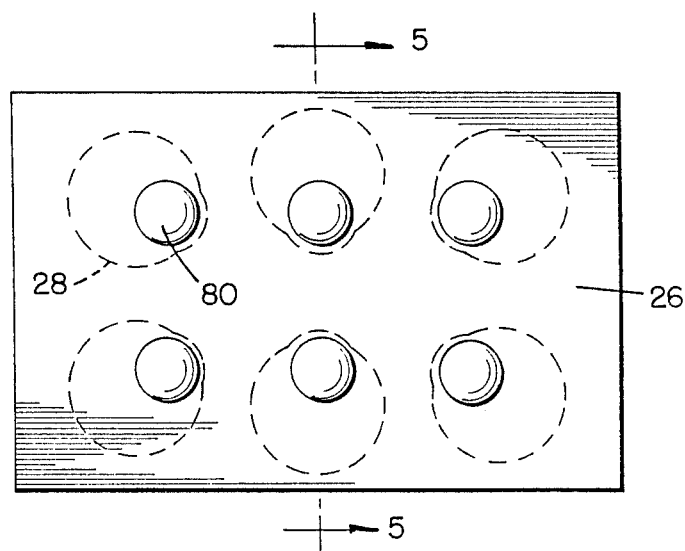

As seen especially clearly in FIGS. 2 and 4, there are a total of six such tactile display devices with each comprising a cavity 28 and all of the components received therein provided with each tactile display unit 22. The relative positioning of each of the cavities 28 is illustrated in FIG. 4 to assure that the touch pins 80 are all properly aligned and the cavities are as large as possible to maximize the rise of the magnets. Thus, it is noted that the electromagnets 36 of each of the devices are not parallel but are angularly disposed in order to achieve the desired alignment of the touch pins 80. This also reduces magnetic interference from one cavity to its neighboring cavities.

Figure 3:
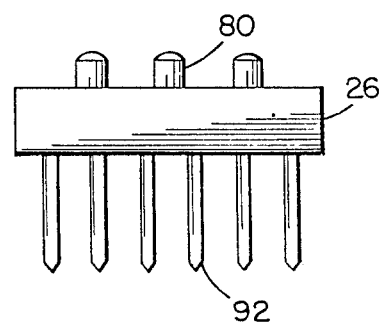
FIGS. 3 and 4 are side elevation and top plan views, respectively, of the tactile display unit illustrated in FIG. 2.
Figure 11:
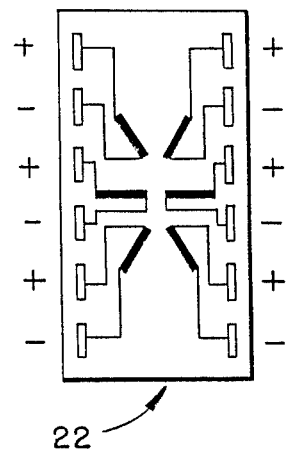
FIGS. 11 and 12 are diagrammatic views generally illustrating the relationship between the electrical and mechanical systems of the invention.
Figure 12:
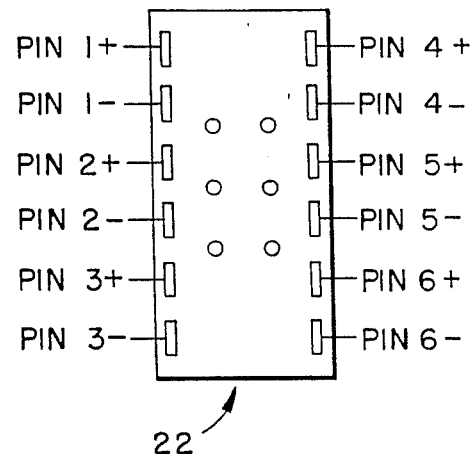

As seen in FIGS. 11 and 12, each tactile display unit 22 has a total of twelve leads extending from opposite poles of each of the six electromagnets 36 therein. Specifically, as previously explained, each electromagnet 36 has a positive lead and a negative lead, alternatively, 48 and 50. Each lead is suitably connected to an associated contact 92 (FIGS. 2 and 3). Also, as previously explained, with respect to FIG. 1, a series of tactile display units 22 are provided on the console 20 for displaying a line of a computer output in Braille characters.

Computers store information as a series of numbers which are represented as an 8 bit byte where each bit represents a digital switch that is either on (High or "1") or off (Low or "0"). These bits are numbered 0–7 and read from right to left where the rightmost bit is the Least Significant Bit (LSB) and the leftmost is the Most Significant Bit (MSB). Each bit is assigned a value which is $2^n$ where n=the bit position as follows:

LSB Bit $0=2°=1$
Bit $1=2^1=2$
Bit $2=2^2=4$
Bit $3=2^3=8$
Bit $4=2^4=16$

Bit $5 = 2^5 = 32$
Bit $6 = 2^6 = 64$
MSB Bit $7 = 2^7 = 128$

Therefore, the byte (8 bits) '01111010' is calculated by the computer (from right to left) as $2+8+16+32+64$ which equals 122. This is the ASCII code for the letter "z". Using this system, the numbers 0–127 (0 through $2^7 - 1$) represent a total of 128 valid ASCII codes. Table 1 is a representation of the Braille character set.

Treating Braille dots 1–6 as a sequence of 6 bits with dot 1 being the least significant bit (LSB, bit 0) and bit 6 as the most significant bit (MSB, bit 5) we can form a numeric representation for each Braille character. Since 2 of the bits are not used, (6 and 7) bit 6, if set, will indicate a "capital letter", bit 7 will indicate a "number". This is required because Braille uses the same codes for some characters. When printed, a "case" symbol (letter, capitals, number) will precede the character that is changing case. Table 2 represents the ASCII to Braille conversion.

TABLE 1

BRAILLE CHARACTER SET DESCRIPTION

```
1 o o 4   This is the basic Brialle cell. The dots are referenced 1-6
2 o o 5   as indicated.
3 o o 6
```

LINE 1:

```
o ·    o ·    o o    o o    o ·    o o    o o    o ·    · o    · o
· ·    o ·    · ·    · o    · o    o ·    o o    o o    o ·    o o
· ·    · ·    · ·    · ·    · ·    · ·    · ·    · ·    · ·    · ·
 a      b      c      d      e      f      g      h      i      j
 1      2      3      4      5      6      7      8      9      0
```

Line 1 consists of the first 10 letters of the alphabet formed by the upper dots (1,2,4,5) of the Braille cell. When preceded by the numeric indicator these cells have the indicated numeric value.

LINE 2:

```
o ·    o ·    o o    o o    o ·    o o    o o    o ·    · o    · o
· ·    o ·    · ·    · o    · o    o ·    o o    o o    o ·    o o
o ·    o ·    o ·    o ·    o ·    o ·    o ·    o ·    o ·    o ·
 k      l      m      n      o      p      q      r      s      t
```

Line 2 adds dot 3 to each of the cells in line 1.

LINE 3:

```
o ·    o ·    o o    o o    o ·    o o    o o    o ·    · o    · o
· ·    o ·    · ·    · o    · o    o ·    o o    o o    o ·    o o
o o    o o    o o    o o    o o    o o    o o    o o    o o    o o
 u      v      x      y      z     and    for    of     the    with
```

Line 3 adds dots 3 and 6 to each of the cells of the first line.

LINE 4:

```
o ·    o ·    o o    o o    o ·    o o    o o    o ·    · o    · o
· ·    o ·    · ·    · o    · o    o ·    o o    o o    o ·    o o
· o    · o    · o    · o    · o    · o    · o    · o    · o    · o
 ch    gh     sh     th     wh     ed     er     ou     ow     w
```

Line 4 adds dot 6 to each of the cells in the first line. Also, the letter "w" was added here by Braille to meet the needs of the English language.

LINE 5:

```
· ·    · ·    · ·    · ·    · ·    · ·    · ·    · ·    · ·    · ·
o ·    o ·    o o    o o    o ·    o o    o o    o ·    · o    · o
· ·    o ·    · ·    · o    · o    o ·    o o    o o    o ·    o o
 ,      ;      :      .      en     !     ( )    "?     in     "
```

Line 5 represents the patterns of line 1 in the lower portion of the cell, using dots 2,3,5,6. Most of these characters have punctuation values.

LINE 6:

```
· o    · o    · o    · o    · ·    · ·
· ·    · ·    · o    · o    · ·    · ·
o ·    o o    o o    o ·    o ·    o o
 /    ing     #      ar     '      -
             number
```

Line 6 is formed with dots 3,4,5,6.

LINE 7:

```
· o    · o    · o    · ·    · o    · ·    · ·
· ·    · o    · o    · o    · ·    · o    · ·
· ·    · ·    · o    · ·    · o    · o    · o
      used for two cell    italic  letter  capital
        contractions       sign;   sign    sign
                           decimal
                           point
```

Line 7 is formed of dots 4,5,6.

TABLE 2

ASCII TD BRAILLE CONVERSION

| Character | ASCII Decimal Value | Braille Decimal Value | Braille Binary Value | Character | ASCII Decimal Value | Braille Decimal Value | Braille Binary Value |
|---|---|---|---|---|---|---|---|
| space | 032 | 000 | 00000000 | P | 080 | 079 | 01001111 |
| ! | 033 | 022 | 00010110 | Q | 081 | 095 | 01011111 |
| " | 034 | 052 | 00110100 | R | 082 | 087 | 01010111 |

TABLE 2-continued
ASCII TD BRAILLE CONVERSION

| Character | ASCII Decimal Value | Braille Decimal Value | Braille Binary Value | Character | ASCII Decimal Value | Braille Decimal Value | Braille Binary Value |
|---|---|---|---|---|---|---|---|
| # | 035 | 074 | 00111100 | S | 083 | 078 | 01001110 |
| $ | 036 | 000 | 00000000 | T | 084 | 094 | 01011110 |
| % | 037 | 000 | 00000000 | U | 085 | 101 | 01100101 |
| & | 038 | 000 | 00000000 | V | 086 | 103 | 01100110 |
| ' | 039 | 004 | 00000100 | W | 087 | 122 | 01111010 |
| ( | 040 | 054 | 00110110 | X | 088 | 109 | 01101101 |
| ) | 041 | 054 | 00110110 | Y | 089 | 125 | 01111101 |
| * | 042 | 000 | 00000000 | Z | 090 | 117 | 01110101 |
| + | 043 | 000 | 00000000 | [ | 091 | 000 | 00000000 |
| , | 044 | 002 | 00000010 |   |     |     |          |
|   | 092 | 000 | 00000000 |   |     |     |          |
| - | 045 | 036 | 00100100 | ] | 093 | 000 | 00000000 |
| . | 046 | 050 | 00110010 |   | 094 | 000 | 00000000 |
| / | 047 | 012 | 00001100 |   | 095 | 000 | 00000000 |
| 0 | 048 | 154 | 10011010 |   | 096 | 008 | 00001000 |
| 1 | 049 | 129 | 10000001 | a | 097 | 001 | 00000001 |
| 2 | 050 | 131 | 10000011 | b | 098 | 003 | 00000011 |
| 3 | 051 | 137 | 10001001 | c | 099 | 009 | 00001001 |
| 4 | 052 | 153 | 10011001 | d | 100 | 025 | 00011001 |
| 5 | 053 | 145 | 10010001 | e | 101 | 017 | 00010001 |
| 6 | 054 | 139 | 10001011 | f | 102 | 011 | 00001011 |
| 7 | 055 | 155 | 10011011 | g | 103 | 027 | 00011011 |
| 8 | 056 | 147 | 10010011 | h | 104 | 019 | 00010010 |
| 9 | 057 | 138 | 10001010 | i | 105 | 010 | 00001010 |
| : | 058 | 018 | 00010010 | j | 106 | 026 | 00011010 |
| ; | 059 | 006 | 00000110 | k | 107 | 005 | 00000101 |
| < | 060 | 000 | 00000000 | l | 108 | 007 | 00000111 |
| = | 061 | 000 | 00000000 | m | 109 | 013 | 00001101 |
| > | 062 | 000 | 00000000 | n | 110 | 029 | 00011101 |
| ? | 063 | 038 | 00100110 | o | 111 | 021 | 00010101 |
| @ | 064 | 000 | 00000000 | p | 112 | 015 | 00001111 |
| A | 065 | 065 | 01000001 | q | 113 | 031 | 00011111 |
| B | 066 | 067 | 01000011 | r | 114 | 023 | 00010111 |
| C | 067 | 073 | 01001001 | s | 115 | 014 | 00001110 |
| D | 068 | 089 | 01011001 | t | 116 | 030 | 00011110 |
| E | 069 | 081 | 01010001 | u | 117 | 037 | 00100101 |
| F | 070 | 075 | 01001011 | v | 118 | 039 | 00100111 |
| G | 071 | 091 | 01011011 | w | 119 | 058 | 00111010 |
| H | 072 | 083 | 01010011 | x | 120 | 045 | 00101101 |
| I | 073 | 074 | 01001010 | y | 121 | 061 | 00111101 |
| J | 074 | 090 | 01011010 | z | 122 | 053 | 00110101 |
| K | 075 | 069 | 01000101 | { | 123 | 000 | 00000000 |
| L | 076 | 071 | 01000111 | \| | 124 | 000 | 00000000 |
| M | 077 | 077 | 01001101 | } | 125 | 000 | 00000000 |
| N | 078 | 093 | 01011101 |   | 126 | 000 | 00000000 |
| O | 079 | 085 | 01010101 | DEL | 127 | 000 | 00000000 |

The ASCII codes 0 through 31 represent handshake and control sequences that are non-printable and executed by the computer system. Characters 32 through 127 are the printable character set.

To convert ASCII to Braille, the code for an ASCII letter must have a corresponding Braille value. This is accomplished by creating a sequential list of elements within a computer program. This list of elements is known as an array. These array elements are sequentially numbered from 0-127. Therefore, if the ASCII code for the letter "z" is 122, the program will read array element 122 and extract the number 65 which is the Braille equivalent.

As indicated in Table 1, special Braille characters exist that change the case of the letters that follow. When designing a Braille character display, firmware would have to be developed that recognizes the case of the character and, if there is a case change, the Braille control code would be inserted into the character string that changes the case. The translated character string would then be passed along a six bit data bus for display on the Braille unit. Driver circuitry would be developed that would correlate a logic 1 (High) to a positive voltage that would raise a desired pin and a logic 0 (Low) as a negative voltage that would lower a desired pin.

While a preferred embodiment of the invention has been disclosed in detail, it should be understood by those skilled in the art that various modifications may be made to the illustrated embodiment without departing from the scope as described in the specification and defined in the appended claims.

What is claimed is:
1. Tactile display apparatus comprising:
a reference surface;
an electromagnet distant from said reference surface having first and second spaced poles of opposite, selectively reversible, polarity;
rotatable cam means proximate to said electromagnet having an axis of rotation transverse to said reference surface and including an integral permanent magnet with third and fourth spaced poles of opposite polarity equidistant from said axis of rotation, said cam means being rotatable between an active position at which said third and fourth poles, respectively, are attracted to and positioned adjacent said first and second poles, and an inactive position at which said fourth and third poles, respectively, are attracted to and positioned adjacent said first and second poles; and a touch pin having a longitudinal axis transverse to said reference surface and including a follower end engageable with said cam means and a tip end distant from said follower end, said pin being movable on said cam means between a first position raised above said reference surface when said cam means is in said active position and a second position not projecting beyond said reference surface when said cam means is in said inactive position.

2. Tactile display apparatus as set forth in claim 1 wherein said reference surface is substantially planar; and wherein said axis of rotation of said cam means and said longitudinal axis of said pin are both perpendicular to said reference surface.

3. Tactile display apparatus as set forth in claim 2 wherein said cam means is generally disk-shaped, has a planar base surface which is substantially parallel to said reference surface, and has an opposed contoured operative surface which ranges between an elevated region of maximum height above said base plane and a nominal region of minimum height above said base plane; and wherein said pin assumes said first position when said follower end is engaged with said elevated region and assumes said second position when said follower end is engaged with said nominal region.

4. Tactile display apparatus as set forth in claim 3 including:
means biasing said follower end into engagement with said operative surface.

5. Tactile display apparatus comprising:
a housing having a cavity therein and defining a reference surface and having an aperture therein for communication between the cavity and said reference surface, the aperture being sized and positioned to freely receive a touch pin therethrough;
an electromagnet fixed to said housing within the cavity distant from said reference surface, said electromagnet having first and second spaced poles of opposite, selectively reversible, polarity;
rotatable cam means proximate to said electromagnet having an axis of rotation transverse to said reference surface and including an integral permanent magnet with third and fourth spaced poles of opposite polarity equidistant from said axis of rotation, said cam means being rotatable between an active position at which said third and fourth poles, respectively, are attracted to and positioned adjacent said first and second poles and an inactive position at which said fourth and third poles, respectively, are attracted to and positioned adjacent said first and second poles; and
said touch pin having a longitudinal axis transverse to said reference surface and including a follower end engageable with said cam means and a tip end distant from said follower end, said touch pin being movable on said cam means between a first position raised above said reference surface when said cam means is in said active position and a second position no higher than said reference surface when said cam means is in said inactive position.

6. Tactile display apparatus as set forth in claim 5 wherein said housing includes:
an integral roof positioned so as to overlie the cavity, said roof defining said reference surface and having therein the aperture for communication between the cavity and said reference surface;
wherein said reference surface is substantially planar; and
wherein said axis of rotation of said cam means and said longitudinal axis of said pin are both perpendicular to said reference surface.

7. Tactile display apparatus as set forth in claim 6 wherein said cam means is generally disk-shaped, has a planar base surface which is substantially parallel to said reference surface, and has an opposed contoured operative surface which ranges between an elevated region of maximum height above said base surface and a nominal region of minimum height above said base surface; and wherein said pin assumes said first position when said follower end is engaged with said elevated region and assumes said second position when said follower end is engaged with said nominal region.

8. Tactile display apparatus as set forth in claim 7 including:
means biasing said follower end into engagement with said operative surface.

9. Tactile display apparatus as set forth in claim 8 wherein said biasing means includes:
an annular shoulder on said pin intermediate said follower end and said tip end and lying in a plane substantially perpendicular to said longitudinal axis; and
a compression spring encircling said pin and extending between said annular shoulder and said cover.

10. Tactile display apparatus as set forth in claim 7 wherein said housing includes positioning means freely engageable with said cam means for maintaining the spacing between said cam means and said reference surface and for defining a center for rotation of said cam means.

11. Tactile display apparatus as set forth in claim 7 wherein said operative surface has a centrally disposed depression formed therein; and
wherein said housing includes a positioning finger integral therewith and freely engageable with said depression for maintaining the spacing between said cam means and said reference surface and for defining a center of rotation for said cam means.

12. Tactile display apparatus as set forth in claim 5 wherein said cam means is generally disk-shaped, has a planar base surface which is substantially parallel to said reference surface, has a centrally disposed projection extending from said base surface, and has a contoured operative surface which ranges between an elevated region of maximum height above said base surface and a nominal region of minimum height above said base surface;
wherein said pin assumes said first position when said follower end is engaged with said elevated region and assumes said second position when said follower end is engaged with said nominal region; and
wherein said electromagnet lies generally in a plane parallel to that of said reference surface; and
including:
a planar bearing member mounted on said electromagnet and lying in a plane parallel to that of said reference surface, said bearing member having a surface facing said reference surface and having a centrally positioned dimple therein to freely receive said projection;

wherein said operative surface has a centrally disposed depression formed therein; and wherein said housing includes a positioning finger integral therewith and freely engageable with said depression for maintaining the spacing between said cam means and said reference surface and for defining a center of rotation for said cam means.

13. Tactile display apparatus as set forth in claim 12 including:

means biasing said follower end into engagement with said operative surface.

14. Tactile display apparatus as set forth in claim 13 wherein said biasing means includes:

an annular shoulder on said pin intermediate said follower end and said tip end and lying in a plane substantially perpendicular to said longitudinal axis; and a compression spring encircling said pin and extending between said annular shoulder and said cover.

15. Tactile display apparatus as set forth in claim 7 including:

means biasing said follower end into engagement with said operative surface.

16. Tactile display apparatus as set forth in claim 15 wherein said biasing means includes:

an annular shoulder on each of said pins intermediate said follower end and said tip end and lying in a plane substantially perpendicular to said longitudinal axis; and a compression spring encircling each of said pins and extending between said annular shoulder and said cover.

17. Tactile display apparatus as set forth in claim 7 wherein said housing includes positioning means freely engageable with each of said cam means for maintaining the spacing between each of said cam means and said reference surface and for defining a center of rotation for each of said cam means.

18. Tactile display apparatus comprising:

a housing having a plurality of cavities therein and defining a reference surface and having a plurality of apertures therein for communication between each cavity and said reference surface;

an electromagnet fixed to said housing within each of the cavities, each said electromagnet being spaced from said reference surface and having first and second spaced poles of opposite, selectively reversible, polarity;

rotatable cam means proximate to each of said electromagnets, each of said cam means having an axis of rotation transverse to said reference surface and including an integral permanent magnet with third and fourth spaced poles of opposite polarity equidistant from said axis of rotation, each of said cam means being rotatable between an active position at which said third and fourth poles, respectively, are attracted to and positioned adjacent said first and second poles and an inactive position at which said fourth and third poles, respectively, are attracted to and positioned adjacent said first and second poles; and a touch pin associated with each of said cam means and having a longitudinal axis transverse to said reference surface, each of said touch pins including a follower end engageable with said cam means and a tip end distant from said follower end, said touch pin being movable on said cam means between a first position raised above said reference surface when said cam means is in said active position and a second position no higher than said reference surface when said cam means is in said inactive position, the aperture being sized and positioned to freely receive said touch pin therethrough.

19. Tactile display apparatus as set forth in claim 18 wherein said housing includes:

an integral roof positioned so as to overlie all of the cavities therein, said roof defining said reference surface and having therein a plurality of apertures for communication between each of the cavities and said reference surface;

wherein said reference surface is substantially planar; and wherein said axis of rotation of each of said cam means and said longitudinal axis of each of said touch pins are both perpendicular to said reference surface.

20. Tactile display apparatus as set forth in claim 19 wherein each of said cam means is generally disk-shaped, has a planar base surface which is substantially parallel to said reference surface, and has an opposed contoured operative surface which ranges between an elevated rêgion of maximum height above said base surface and a nominal region of minimum height above said base surface; and wherein each of said pins assumes said first position when said follower end is engaged with said elevated region of its associated said cam means and assumes said second position when said follower end is engaged with said nominal region thereof.

* * * * *